United States Patent Office 3,237,964
Patented Mar. 1, 1966

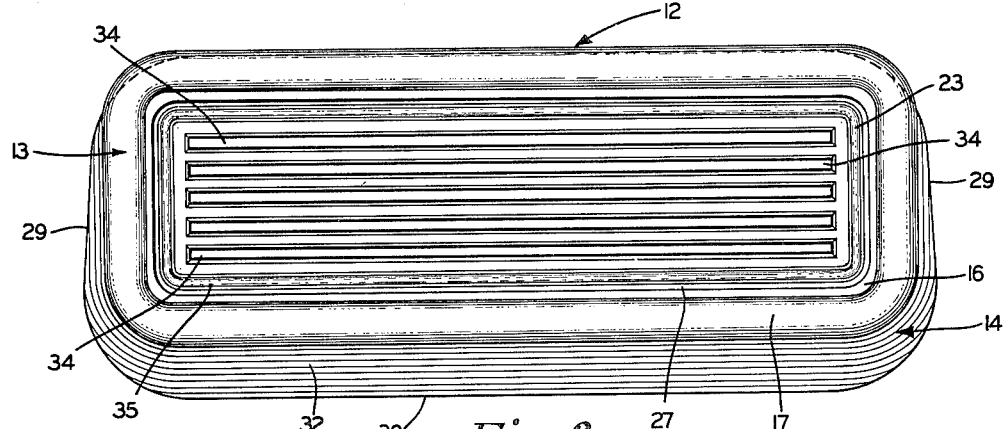
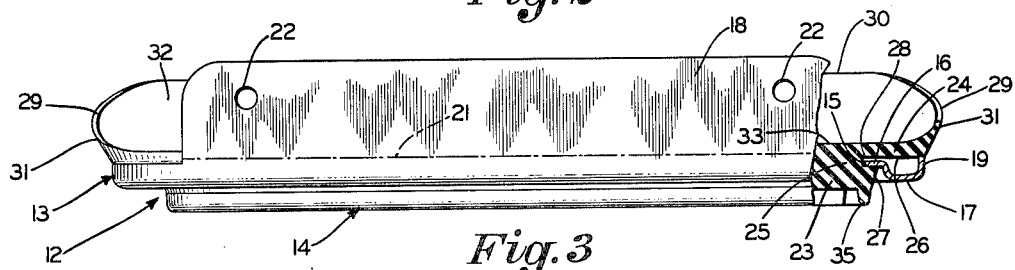
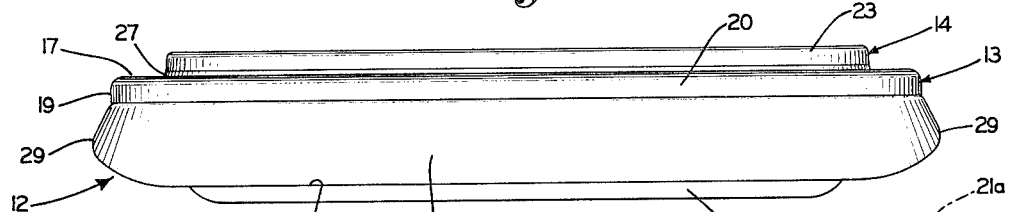
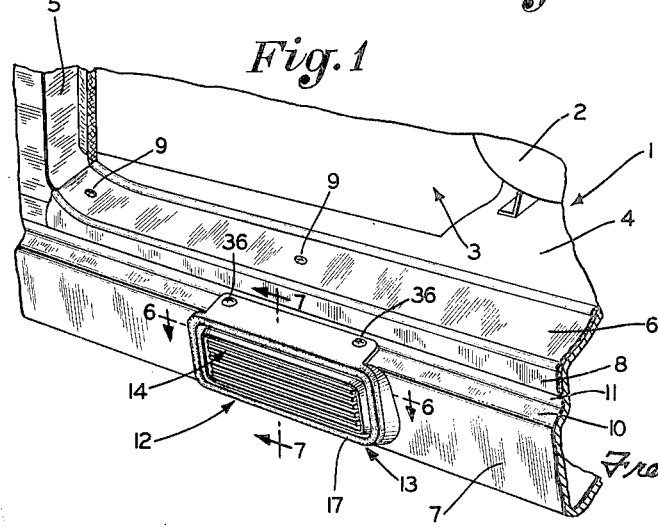
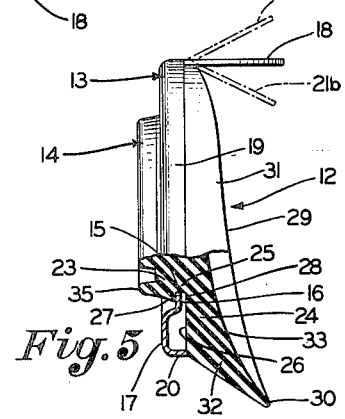

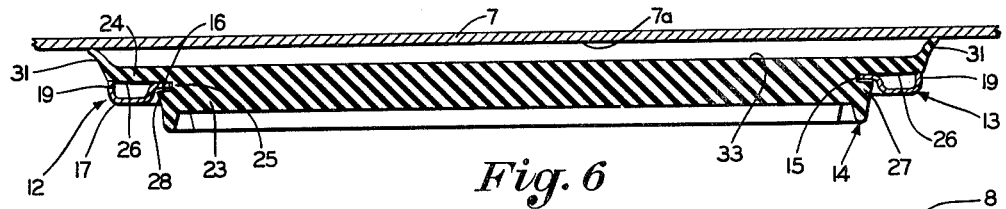
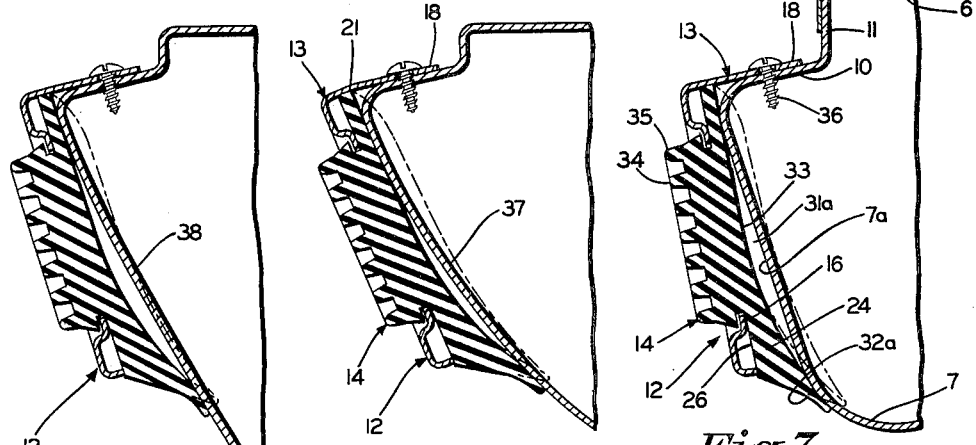
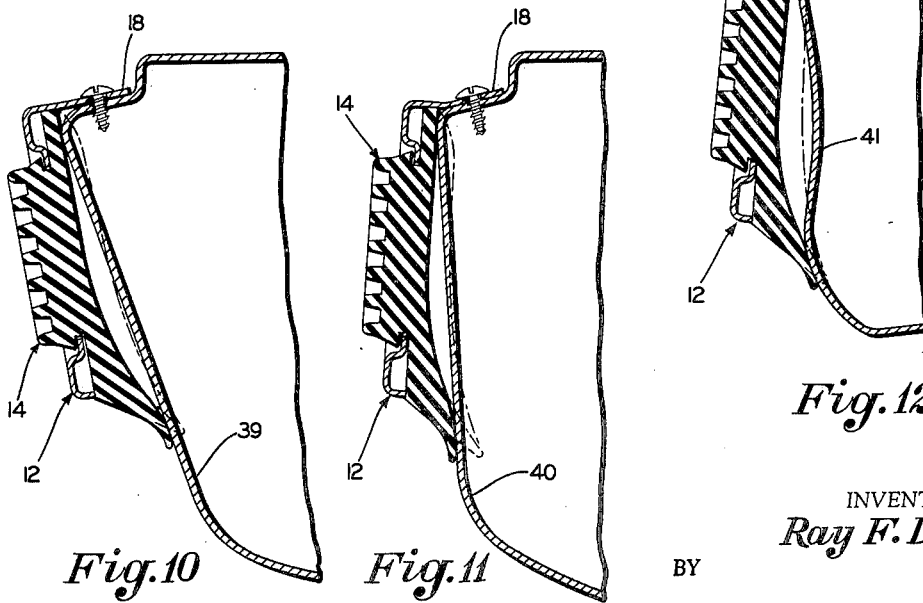

3,237,964
AUTO KICK PLATE CONSTRUCTION
Ray F. Doyle, Alliance, Ohio, assignor to Everhard Products Inc., Canton, Ohio, a corporation of Ohio
Filed Aug. 28, 1964, Ser. No. 392,786
6 Claims. (Cl. 280—164)

The invention relates to a kick plate attachment or accessory for a typical passenger automobile and more particularly to a construction which may be attached readily and quickly to the rocker panel of any modern automobile beneath any door opening that will not rattle in use and that provides a member which may be kicked by an auto user to dislodge snow, ice, sand, mud, dirt or other foreign matter from the shoes of the user without damage to the automobile or the user.

Snow, ice, moisture, sand, dirt and other foreign matter carried on the shoes of an auto driver or passenger, into an automobile during inclement weather or under various weather or road conditions is a constant source of annoyance to automobile users.

For example, it is difficult in the winter and during snowy conditions to remove snow from one's shoes upon entering an auto. Ordinarily, some snow is tracked into the auto where it melts and collects on the floor. Either it may then freeze to form ice on the floor, which is a hazard, or the collected puddle may soil the coat or other clothing of some individual in the auto if such clothing contacts the puddle.

Many types of scraper devices or attachments for autos have been proposed for use to scrape foreign matter from the shoes of an auto user. However, such scraper in actual use normally only are contacted by the soles of shoes and cannot be used effectively or efficiently to substantially entirely dislodge or remove foreign matter, including snow or ice, from all surfaces of an auto user's shoes.

The most effective known manner of dislodging foreign matter from a shoe is to abruptly arrest a kicking force imparted to the shoe. This shakes the foreign matter from all shoe surfaces. For example, a baseball player typically strikes one and then the other shoe with a bat in assuming a batting stance to dislodge foreign matter from the player's shoes.

If it is attempted to kick foreign matter off of shoes before entering the doorway of an auto, the adjacent auto rocker panel is the only available member that may be kicked. Auto rocker panels or the painted surfaces thereof may become chipped, dented or scraped from such kicking. Thus, such kicking normally is avoided.

In accordance with the present concept, a kicking force against the rocker panel below an auto door is utilized for removal of foreign matter from shoes, but the surface of the rocker panel zone kicked is protected by a yielding rubber plate not only to absorb the kicking force and prevent injury to the foot being kicked but also to prevent damage to the rocker panel zone kicked.

From a practical standpoint, in order to satisfy these objectives, the kick absorbing and rocker panel protecting plate means must be adapted for ready assembly at a location convenient for use on the rocker panel of substantially any model or make of car both new and old made now or for some years past, regardless of the particular configuration and orientation of th particular rocker panel surface. Added to this problem is the further problem of effectively mounting the kick plate means on an auto rocker panel without any tendency to rattle.

Accordingly, it is a general object of the present invention to provide a new kick plate construction for attachment to the rocker panel of an automobile which may be used effectively to dislodge foreign matter from the shoes of an auto user upon kicking the plate.

Furthermore, it is an object of the present invention to provide a new auto kick plate construction which may be readily attached in interfitting relation over surfaces of the rocker panel of an auto body below any door opening so that the plate may be conveniently kicked by an auto user upon entering the auto to dislodge foreign matter from the user's shoes.

Also, it is an object of the present invention to provide a new auto kick plate construction which may be effectively attached as an accessory to the rocker panel of almost any modern passenger automobile regardless of the cross-sectional configuration and orientation of the rocker panel.

In addition, it is an object of the present invention to provide a new auto kick plate construction which include resilient plate means and frame means for the plate means which may be cooperatively assembly with an auto rocker panel member so as to prevent rattling of the kick plate device in operation of the auto and also so as to provide a zone to be kicked which is sufficiently yielding to absorb the kicking force without damage to the automobile body or injury to the shoe or foot of the auto user.

Finally, it is an object of the present invention is provide a new auto kick plate construction which provides for the effective removal by kicking of snow, ice, sand, and mud from the shoes of an auto user, which achieves the stated objects in a simple, effective and inexpensive manner, and which solves problems and satisfies needs long existing in the art.

These and other objects and advantages, apparent to those skilled in the art, from the following description and claims, may be attained, the stated results achieved, and the described difficulties overcome, by the apparatus, combinations, parts, elements, arrangements and constructions which comprise the present invention, the nature of which is set forth in the following general statement, a preferred embodiment of which—illustrative of the best mode in which applicant has contemplated applying the principles—is set forth in the following description and shown in the drawing, and which are particularly and distinctly pointed out and set forth in the appended claims forming a part hereof.

The nature of the new auto kick plate construction of the present invention may be stated in general terms as including a preferably generally rectangular frame formed of a sturdy, stiff durable material such as aluminum, stainless steel or plastic having an elongated preferably rectangular opening formed therein defined by flange means projecting inwardly of the opening generally in the plane of the frame and surrounded preferably by a curved bead raised forwardly of the plane of the frame and terminating at its outer periphery in a rearwardly projecting flange having top, side and bottom flange portions, the top flange portion extending rearwardly a greater distance than the side and bottom flange portions, the side and bottom flange portions extending rearwardly beyond the plane of the frame and opening-defining flange means, the top flange portion being scored along a line lying parallel with the plane of the frame to permit selective bending along said score line, and said top flange portion being provided with openings for the reception of means for attaching the frame to an auto rocker panel shoulder; a resilient plate member preferably formed of rubber including an elongated pad portion, an enlarged base portion having a front surface, a neck portion connecting said pad and base portions, the pad portion having a peripheral shoulder overlying the base portion front surface, said shoulder being spaced from said front surface by said neck portion, and said shoulder, neck portion and front surface defining a recess; the resilient plate member being assembled with said frame with the frame opening-defining flange means extending into said recess, with the neck portion extending through the frame opening, with the pad shoulder engaged with the frame opening-defining flange means, and with the side and bottom flange portions of the rearwardly projecting frame flange engaged with the plate member front surface; the resilient plate member base portion having side and bottom edges, a rearwardly extending lip formation at each base portion side edge, a thickened downwardly and rearwardly extending lip formation at the base portion bottom edge, said lip formations providing the base portion with a rear surface generally concave in both horizontal and vertical section, and the pad portion having a front surface provided with anti-slip formations.

By way of example, an embodiment of the improved auto kick plate construction is shown in the accompanying drawings forming part hereof, in which:

FIGURE 1 is a perspective view illustrating the improved kick plate construction attached to the rocker panel of an automobile below one of the auto door openings;

FIG. 2 is a front elevation of the improved kick plate;

FIG. 3 is a top plan view with parts broken away and in section, of the device shown in FIG. 2;

FIG. 4 is a bottom plan view of the device shown in FIG. 2;

FIG. 5 is a side elevation with parts broken away and in section, of the device shown in FIG. 2;

FIG. 6 is a longitudinal sectional view looking in the direction of the arrows 6—6, FIG. 1;

FIG. 7 is a vertical sectional view looking in the direction of the arrows 7—7, FIG. 1; and FIGS. 8, 9, 10, 11, and 12 are views similar to FIG. 7, showing the improved kick plate construction attached to auto rocker panels having various cross-sectional configurations and surface orientations.

Similar numerals refer to similar parts throughout the various figures of the drawings.

A portion of an automobile is indicated generally at 1 including an end of a front seat 2, foot well 3, body floor portion 4, and body upright door frame member 5. The sill 6 of the door frame may be formed as a part of a typical rocker panel 7 which is incorporated as a part of the body framing elements.

The sill 6 sometimes is covered with a scuff plate indicated at 8, secured to the rocket panel by screws 9. Rocker panel 7 usually is provided with a slightly angled shoulder 10 to offset the exposed portion of rocker panel 7 (below the door not shown) from the upright rocker panel portion 11 which joins with sill 6.

The improved kick plate construction of the present invention indicated generally at 12 comprises a generally rectangular frame indicated generally at 13 and a resilient plate member indicated generally at 14. Frame 13 is formed of sturdy, stiff, durable material such as aluminum, stainless steel or plastic, and is provided with an elongated preferably rectangular opening 15 defined by flange means 16 projecting inwardly around opening 15 in a plane which may be said generally to comprise the plane of the frame.

Flange means 16 is surrounded by a preferably curved bead 17 which is raised forwardly of the plane of the frame and terminates at its outer periphery in a rearwardly projecting flange having top portion 18, side portions 19 and bottom portion 20. Top flange portion 18 extends rearwardly a greater distance than the side and bottom flange portions 19 and 20, while side and bottom flange portions 19 and 20 extend rearwardly beyond the plane of the frame and beyond opening-defining flange means 16 as shown in FIGS. 3 and 5.

Top flange portion 18 preferably is scored along a line indicated by dot-dash line 21 so that a part of top flange portion 18 may be bent upward or downward, as indicated at 21a and 21b in dot-dash lines in FIG. 5, a selected amount or degree such as to enable frame 13 to be properly attached to auto rocker panel 7 as described in more detail below. Score line 21 is located parallel with the plane of the frame, and top flange portion 18 is provided with openings 22 of any desired number, two being shown, for receiving screws or other attaching means for mounting the kick plate on an auto.

Plate member 14 preferably is molded of rubber or other resilient material and includes elongated pad portion 23, enlarged base portion 24 and neck portion 25 connecting the pad and base portions. Base portion 24 has a front surface 26 and pad portion 23 has a peripheral shoulder 27 overlying front surface 26. Shoulder 27 is spaced from front surface 26 by neck portion 25, and shoulder 27, neck portion 25 and front surface 26 define a recess 28.

Plate member 14 is sufficiently resilient to be deformed for assembly with frame 13 by pushing pad portion 23 and its shoulder 27 through opening 15 until shoulder 27 engages over flange 16 with flange 16 seated in recess 28. When so assembled, neck portion 25 extends through frame opening 15, pad shoulder 27 engages a surface of the frame opening-defining flange 16, and side and bottom flange portions 19 and 20 engage plate member front surface 26 as shown in FIGS. 3 and 5.

Plate base portion 24 has side edges 29 (FIGS. 2, 3, and 4) and a bottom edge 30. Each side edge 29 is formed with a rearwardly extending lip formation 31 (FIGS. 3, 5, and 6) and bottom edge portion 30 also is provided with a thickened downwardly and rearwardly extending lip formation 32. The side edge lip formations 31 (FIG. 6) provide base portion 24 with a rear surface 33 which is generally concave in horizontal section from lip 31 at one edge 29 to lip 31 at the other side edge 29. The thickened downwardly and rearwardly extending lip 32 also provides base portion rear surface 33 with a concave shape in vertical section as shown in FIGS. 5 and 7 through 12.

The front surface of plate member pad portion 23 preferably is provided with anti-slip formations such as spaced ribs 34 extending laterally between the side edges of the pad portion 23 and a surrounding peripheral rectangular rib 35.

FIGURE 7 typically illustrates the improved kick plate construction 12 secured to the rocker panel 7 of an auto by screws 36 engaged through openings 22 with rocker panel shoulder 10 so as to securely mount top flange portion 18 of frame 13 on rocker panel shoulder 10. Screws 36 are so located and driven home that plate member 14 is tightly clamped and compressed between rocker panel 7 and frame 13. Clamping is accompanied by deformation of lip formations 31 and 32 from dot-dash to full line positions illustrated in FIG. 7, wherein the deformed edge lips are indicated at 31a and the deformed bottom lip is indicated at 32a.

The deformation of lips 31 and 32 accompanying clamping of plate member 14 against rocker panel 7 also forces front surface 26 of base portion 24 of member 14 against the inner surface of the opening-defining frame flange means 16 as illustrated in FIG. 7. Thus, the improved kick plate construction 12 when mounted on auto rocker panel 7 is prevented from rattling because resilient portions of the plate member 14 are clamped under pressure between rocker panel 7 and frame member 13.

A kick plate 12 thus mounted below a door opening as illustrated in FIG. 1 provides a device which may be kicked conveniently by an auto user upon entering the auto to dislodge snow, ice, sand, mud, dirt, or other foreign matter from the shoes of the user. The resilient plate member 14 which is kicked absorbs the force of kicking and cushions the blow. The cushioning characteristic is enhanced by the spaced zone between rear face 33 (FIGS. 6 and 7) of plate member 14 and the outer adjacent face portion 7a of rocker panel 7. The space between face 33 and rocker panel face portion 7a permits pad and base portions 23 and 24 when kicked to yield or deform into such space and toward the rocker panel until portions of face 33 contact panel face 7a, accompanied by further deformation of lips 31 and 32.

However, after the kicking force has been absorbed, the plate member 14 returns to normal clamped position, such as illustrated in FIG. 7.

Thus, even though severaly kicked, the shoes or foot of the kicker are not injured. Furthermore, the cushioning protects the rocker panel from kicking damage yet the kicking force may be sufficiently strong to completely dislodge all foreign matter from all surfaces of the shoes of the kicker.

Although anti-slip formations have been illustrated as ribs 34 and 35 on the front surface of pad portion 23, any anti-slip formation may be used. The important point is that some anti-slip formation preferably is provided to prevent the shoe or toe from slipping off of the kick plate during the kicking operation, the occurrence of which could result in foot injury.

FIGURE 7 typically illustrates a cross-sectional configuration of the rocker panel on some makes, models or styles of passenger autos. However, different makes and models of autos from year to year have had many different rocker panel shapes and surface orientations. A number of typical shapes and orientations are illustrated in FIGS. 8 through 12. Greater degrees of curvature of the rocker panel surfaces 37 and 38 are illustrated in FIGS. 8 and 9 as compared with the generally flat surface of the rocker panel 7 in FIG. 7. Also, in FIG. 8 the rocker panel surface orientation is more sharply inward than in FIG. 9. The improved construction may be mounted readily on the different rocker panel shapes of FIGS. 8 and 9, as illustrated. It is preferred to bend the top flange portion 18 along score line 21 slightly downward as illustrated in FIG. 8 to obtain the desired clamping compression of member 14 between frame 13 and rocker panel 7.

FIGURES 10, 11, and 12 show other rocker panel shapes 39, 40, and 41 upon which the improved kick plate 12 may be mounted readily merely by bending top flange portion 18 to the desired degree in the necessary direction, as illustrated.

In each of the mountings typically illustrated in FIGS. 7 through 12, the anti-rattle and cushioning effects are present; and the improved construction has substantially universal application to all types and makes of autos both old and new. In every instance, the resilient plate 14 will deform to form-fit the rocker panel so as to insure the kick absorbing and protective characteristics of the construction.

Thus in use, snow, ice, mud, and sand can be kicked off of a car user's shoes before entering the car so that the inside of the car may be kept clean and neat and free from water and dirt. At the same time, the rocker panel is protected from being chipped, dented or scraped from kicking.

Accordingly, the improved construction of the present invention provides an auto kick plate of universal application to enable foreign matter to be kicked from the shoes of an auto user without injury or damage to the user or auto; provides a construction which may be readily attached to an auto free of rattling difficulties; and provides a construction which solves problems and satisfies needs long existing in the art and which achieves the stated objects and accomplishes the many new functions and results described.

In the foregoing description, certain terms have been used for brevity, clearness, and understanding, but no unnecessary limitations are to be implied therefrom beyond the requirements of the prior art, because such terms are used for descriptive purposes and are intended to be broadly construed.

Although shoes have been referred to repeatedly herein as being the article from which foreign matter may be dislodged by kicking against the improved kick plate construction, it is to be understood that the term "shoes" is used in its broadest sense as including boots or any other type of foot apparel which may be worn and freed of foreign matter by kicking.

Moreover, the description and illustration of the invention is by way of example, and the scape of the invention is not limited to the exact structure shown, because the sizes and shapes of the elements or components may be varied to provide other structural embodiments, without departing from the fundamental principles of the invention.

Furthermore, while the improved kick plate construction has been described and illustrated as being attached directly to an auto rocker panel, it is to be understood, in connection with chrome decorative strips frequently mounted on auto rocker panel surfaces, that the improved kick plate construction may be mounted on a chrome strip decorated rocker panel.

Having now described the features, discoveries and principles of the invention, the construction, mounting, performance and use of a preferred form thereof, and the advantageous, new and useful results obtained thereby, the new and useful discoveries, principles, apparatus, combinations, parts, elements, arrangements, constructions and cooperative relationships, and mechanical equivalents obvious to those skilled in the art are set forth in the appended claims.

I claim:

1. Kick plate construction for attachment to the rocker panel of an auto including, a substantially rigid frame member provided with an elongated opening, an elongated resilient plate member received in and extending through said opening from the front to the rear of the frame member, inter-engaging flange and recess means formed on the frame and plate members holding said members assembled, the frame member having a rearwardly extending flange for attachment to an auto rocker panel shoulder, and the plate member having rearwardly extending lip means forming a concave rear plate surface adapted to deformingly engage such auto rocker panel when the frame flange is attached to the rocker panel shoulder.

2. The construction defined in claim 1 in which the frame and plate members and the frame opening are generally rectangular in shape, in which the frame member is formed of metal and the plate member is formed of rubber, in which the rearwardly extending frame flange is scored for bendability to adapt said flange for attachment to rocker panel shoulders of differently oriented rocker panel shapes, and in which the plate member has a front surface provided with anti-slip formations.

3. The construction defined in claim 1 in which the frame member has the said flange means projecting inwardly of the plane of and defining the frame opening, and has rearwardly projecting flange means, a portion of which last mentioned flange means comprises the auto rocker panel attaching flange; in which the plate member has a pad portion formed with a shoulder, an enlarged base portion having a front surface and a neck portion connecting the pad and base portions; in which the pad shoulder, neck and base front surface form a recess engaging the inwardly projecting frame flange means holding the members assembled; and in which the remainder of the rearwardly projecting frame flange means engages the base front surface when the members are inter-engagingly assembled.

4. The construction defined in claim 1 in which the plate member has a base portion located rearwardly of the plane of the frame opening when the members are inter-engagingly assembled; in which the base portion has side and bottom edges; in which the base side edges each are formed with a rearwardly extending lip formation; and in which the base bottom edge is formed with a thickened rearwardly and downwardly extending lip formation.

5. Kick plate construction for attachment to the rocker panel of an auto including, a substantially rigid, elongated, generally rectangular, metal frame member provided with an elongated rectangular opening, the frame member having flange means projecting inwardly of the plane of and defining the frame opening; the frame member also having rearwardly projecting peripheral flange means surrounding said inwardly projecting flange means and comprising top, side and bottom rearwardly projecting flange portions, the top flange portion extending rearwardly a greater distance than the side and bottom flange portions, and the side and bottom flange portions extending rearwardly beyond the plane of the opening-defining flange means; the top flange portion being scored along a line lying parallel with the plane of the opening, and the top flange portion being provided with means for attaching the frame to an auto rocker panel; an elongated, generally rectangular, rubber plate member having a pad portion formed with a shoulder, an enlarged base portion provided with a front surface spaced from said shoulder, and a neck connecting the pad and base portions; the pad shoulder, neck portion and base front surface forming a recess; the rubber plate member being assembled with the frame member with the frame opening-defining flange means extending into and interengaged in said recess, with the neck portion extending through the frame opening, with the pad portion located in front of said frame member with its shoulder engaged with the frame opening-defining flange means, and with the side and bottom flange portions of the rearwardly projecting frame flange means engaged with the plate member front surface; the base portion having side and bottom edges, each base side edge being formed with a rearwardly extending lip, the bottom edge being formed with a thickened rearwardly and downwardly extending lip, and the lip formations forming a rear base surface concave in horizontal and vertical section adapted to deformingly engage a rocker panel surface; and the pad portion having a front surface provided with anti-slip formations.

6. A kick plate article of manufacture for attachment to the rocker panel of an auto comprising an elongated resilient member having a pad portion formed with a shoulder, an enlarged base portion having a front surface spaced from said shoulder, and a neck portion connecting the pad and base portions; the pad shoulder, neck portion and base front surface forming a recess; the base portion having side and bottom edges, each base side edge being formed with a rearwardly extending lip, and the bottom edge being formed with a thickened rearwardly and downwardly extending lip; and the lip formations forming a rear surface on said base portion concave in horizontal and vertical section adapted to deformingly engage a rocker panel surface to which the kick plate article is attached.

References Cited by the Examiner

UNITED STATES PATENTS

| | | | |
|---|---|---|---|
| 1,711,116 | 4/1929 | Keenan | 280—163 |
| 1,972,283 | 9/1934 | Zimmers | 280—163 |
| 2,260,129 | 10/1941 | Wetzel | 280—163 X |
| 2,270,266 | 1/1942 | Cavanagh | 280—163 X |
| 2,296,629 | 9/1942 | Cappock | 280—164 |
| 2,546,394 | 3/1951 | Harmon | 280—150 X |
| 2,614,877 | 10/1952 | Benian | 293—71 X |
| 2,692,144 | 10/1954 | Wofford | 280—164 |
| 3,103,681 | 9/1963 | Crook | 280—164 X |

BENJAMIN HERSH, *Primary Examiner.*

W. A. MARCONTELL, *Assistant Examiner.*